3,418,256
CATALYST REGENERATION
James Arthur Rigney and Glen Porter Hamner, Baton Rouge, and Ralph Burgess Mason, Denham Springs, La., assignors to Esso Research and Engineering Company, a corporation of Delaware
No Drawing. Filed May 26, 1965, Ser. No. 459,107
12 Claims. (Cl. 252—415)

ABSTRACT OF THE DISCLOSURE

Sulfur-containing crystalline alumino-silicate zeolite catalysts are regenerated by the steps of contacting the deactivated catalyst with chlorine or a halogen containing compound at elevated temperature followed by burning with air at elevated temperature.

---

This invention relates to the regeneration of catalysts comprising crystalline alumino-silicate zeolites. Particularly, it relates to the regeneration of crystalline alumino-silicate zeolite hydrocarbon conversion catalysts which have been used in the treatment of sulfur-containing petroleum feed stocks.

Crystalline alumino-silicate zeolites are now well known in the art as highly efficient adsorbents for use in various hydrocarbon separation processes and the like. Recently, these crystalline zeolitic materials have gained wide acceptance as catalysts for organic conversion reactions, particularly hydrocarbon conversion reactions. They are characterized by a highly-ordered crystalline structure and uniformly-dimensioned pores, and are distinguishable from each other on the basis of their composition, crystal structure, adsorption properties, and the like. A number of these zeolite materials are described, for example, in U.S. Patent Nos. 3,013,982–86 wherein they are characterized by their composition and X-ray diffraction patterns. For use in hydrocarbon conversion processes, it has been found necessary to reduce the alkali metal content of the zeolites, which metal forms an integral part of the original crystal structure of the zeolite either in its natural form or as prepared synthetically. Reduction of alkali metal content is readily accomplished by ion-exchange procedures wherein a desired cation is introduced into the zeolitic structure and replaces the initially present alkali metal cation. In this manner, various degrees and types of catalytic activity can be conferred on the zeolitic material, depending upon the particular cation introduced. Suitable cations for hydrocarbon conversion reactions will be hereinafter set forth.

The use of crystalline zeolites as catalysts has created the need for effective regeneration procedures in order that the catalysts can be used repeatedly and have an economical life. The most commonly employed regeneration procedure involves contacting the deactivated catalyst, which may have become contaminated with any of a number of impurities originally present in a hydrocarbon feed, with an oxygen-containing gas at elevated temperatures. While this procedure has proved to be generally satisfactory, the regeneration conditions must usually be carefully controlled in order that the crystalline structure not be damaged or otherwise altered. Since the high catalytic activity and efficiency of crystalline alumino-silicate zeolites is directly attributed to their highly-ordered crystalline structure and the uniformity of their pore openings, it will be appreciated that a successful regeneration process should substantially restore the zeolitic adsorption and catalytic properties. It has now been recognized that conventional regeneration procedures involving the use of oxygen-containing gases at high temperature, when applied to crystalline alumino-silicate zeolite catalysts, can often lead to deleterious results unless certain conditions are satisfied. In particular, it has been discovered that when these crystalline zeolitic catalysts have undergone contact with sulfur, such as by utilization in the processing of sulfur-containing feeds or by pretreatment with sulfur-containing gases (which may be desired to increase catalytic activity), and have then become contaminated with deactivating impurities, such as polymeric carbonaceous residues and the like, subsequent regeneration wtih oxygen-containing gases at elevated temperature is often unavailing or less effective than would otherwise be expected and can even result in decreased catalytic activity and adsorption capacity by at least partial collapse of the crystalline zeolite structure. Thus, whereas sulfur is a known activator for these zeolitic catalysts, probably through chemical combination with the cationic portions of the zeolitic crystal structure, it has now been found that its presence during oxygen regeneration is extremely undesirable. Without being limited to any particular theory for this behavior, it is believed that instead of eliminating this chemically combined sulfur as a sulfur oxide, contact of the sulfur-containing zeolite with oxygen-containing gases at elevated temperatures causes conversion of the sulfur to sulfate anion which is retained within the crystal lattice structure of the zeolite; and that the presence of this large anion causes a substantial reduction in the pore volume of the crystalline zeolite with a concomitant reduction in surface area accessible to incoming feed molecules.

It is therefore the purpose of the present invention to provide an improved regeneration process for deactivated crystalline alumino-silicate zeolite catalysts which have undergone contact with sulfur or sulfur-containing compounds, either separately or during processing with sulfur-containing feedstocks. Briefly, the present invention contemplates substantial removal of sulfur from the zeolite catalyst prior to contact with high temperature oxygen-containing gases, in order that the catalyst be essentially sulfur-free during the "burning" stage. This is accomplished by treating the catalyst with a reactive material capable of removing the sulfur from the crystalline zeolite catalyst.. Among the suitable materials are free halogen, e.g. chlorine; and halogen containing compounds. The latter include hydrogen halides, e.g. hydrogen chloride; organic halides such as alkyl and aryl mono- and polyhalides, as well as halogenated acids, aldehydes, ketones, etc. Suitable alkyl halides, will, for example, include methyl chloride, ethyl chloride, etc. Preferred organic halides will be those having a relatively high halogen content such as a tetrahalide, e.g. carbon tetrachloride, etc.; or a trihalide, e.g. chloroform, tertiary butyl chloride; or other polyhalide compounds such as perchloroethane, etc. Examples of other suitable materials will include methylene chloride, dichlorodifluoromethane, bromotrichloromethane, phosgene, etc. More preferred will be chlorine and chlorine-containing compounds; and, of the above-mentioned chlorine compounds, carbon tetrachloride, tertiary butyl chloride, chloroform and methyl chloride will be especially preferred, with carbon tetrachloride being the most preferred because of its effectiveness as well as its ease of handling.

In general, the crystalline alumino-silicate zeolites within the purview of the present invention may be represented by the following formula, expressed in terms of moles:

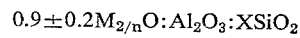

$$0.9 \pm 0.2 M_{2/n}O : Al_2O_3 : XSiO_2$$

wherein M is selected from the group consisting of metal cations and hydrogen, $n$ is its valence, and X is a number from about 1.5 to about 12. The value of X will vary with the particular zeolite in question. Among the well-known natural zeolites are mordenite, faujasite, chabazite, gmelinite, analcite, erionite, etc. Such zeolites differ in structure, composition, and particularly in the ratio of silica to alumina contained in the crystal lattice structure; e.g. mordenite, having a ratio of about 8 to about 12; faujasite, having a ratio of about 2.5 to about 7; etc. Similarly, the various types of synthetic crystalline zeolites, e.g. faujasite, mordenite, etc., will also have varying silica to alumina ratios depending upon such variables as composition of crystallization mixture, reaction conditions, etc. U.S. Patent Nos. 3,013,982–86 described a number of synthetic zeolites, designated therein as zeolites A, D, L, R, S, T, X and Y.

The processes for producing such crystalline synthetic zeolites are well known in the art. Typically, they involve crystallization from reaction mixtures containing: $Al_2O_3$ as sodium aluminate, alumina sol and the like; $SiO_2$ as sodium silicate and/or silica gel and/or silica sol; alkali metal oxide, e.g. sodium hydroxide, either free or in combination with the above components; and water. Careful control is kept over the alkali metal oxide concentration of the mixture, the proportions of silica to alumina and alkali metal oxide to silica, the crystallization period, etc., to obtain the desired product.

The zeolites which will be most preferred in the present invention will be of the synthetic variety, and particularly will be either of the synthetic faujasite variety, wherein, for example, X in the above formula is above about 3, preferably 3 to 6, most preferably 4 to 5.5, and has uniform pore openings in the range of about 6 to 15, preferably 6 to 13, Angstrom units; or of the synthetic 5 A. variety sometimes designated as "Zeolite A" or "Type A" zeolite, the preparation of which is described, for example, in U.S. Patents 3,114,603 and 3,058,805. The latter is characterized by uniform pore openings of about 5 A. in diameter and has been utilized for selective conversion reactions such as disclosed in U.S. 3,140,322 based upon its dual capacity to act as a catalyst and also to selectively admit certain-sized molecules into contact with its catalytic surfaces while excluding larger molecules.

As hereinbefore mentioned, for use as a catalyst, the crystalline alumino-silicate zeolite is customarily base exchanged with a desired cation to replace alkali metal initially present in the zeolite as found naturally or as synthetically prepared. Thus, in the original zeolite, M in the above formula is usually an alkali metal, such as sodium, and is replaced by base exchange with a suitable cation or mixture of cations so that the alkali metal oxide content of the zeolite is reduced. The exchange treatment should usually be sufficient to reduce the zeolitic alkali metal content, e.g. sodium and/or potassium content, to less than about 10 wt. percent (as $Na_2O$), preferably less than about 3 wt. percent $Na_2O$, and most preferably to within the range of about 0 to 2 wt. percent $Na_2O$. The purpose of the base exchange procedure is to substantially remove alkali metal cations, which have been found to be deleterious to hydrocarbon conversion reactions, as well as to introduce particularly desired catalytic activity by means by means of the various cations utilized in the exchange medium. For catalytic applications, suitable cations for exchanging the zeolite include hydrogen-containing cations, e.g. ammonium ions, and cations of metals in Groups I–B to VIII and rare earth metals, preferably cations of metals in Group II, III, IV, V, VI–B, VII–B, VIII and the rare earth metals. More than one cation may be introduced by the use of cation mixtures or by successive exchange treatments. Preferred cations include hydrogen or hydrogen-containing cations, e.g. ammonium ion, and magnesium, cobalt, nickel, zinc, magnesium, barium, calcium, cadmium, copper, iron and barium cations. Hydrogen-containing and/or magnesium and/or zinc cations will be particularly preferred. Ion exchange is accomplished by conventional contact of the zeolite with a suitable salt solution of the desired cation, such as the sulfate, chloride, nitrate, etc.

The above base-exchanged crystalline zeolites can be employed as catalysts per se, such as for catalytic cracking operations. Additionally, they may be employed as supports for suitable hydrogenation components in such processes as hydrocracking. Catalytic metals which may be deposited on the above base-exchanged crystalline zeolite can be any of the well-known catalytic metals customarily employed in organic conversion processes, particularly hydrocarbon conversion processes. Such metals, for example, will include platinum, palladium, iridium, rhodium, iron, cobalt, nickel, manganese, tungsten, titanium, zirconium, vanadium, hafnium, zinc, cadmium, tin, lead, aluminum, chromium, molybdenum, etc. For hydrocracking reactions it has been found most preferable to impregnated the crystalline zeolite with a platinum group metal, i.e. metals of the platinum and palladium series of the Periodic Table, preferably platinum or palladium, and most preferably palladium. The base-exchanged crystalline zeolite can be composited with a platinum group metal, for example, by treatment with a solution of a platinum group metal salt or ammonium complex, e.g. ammonium chloroplatinate, ammoniacal palladium chloride, etc., to thereby incorporate a catalytic amount of the metal. Following such incorporation the catalyst can be subjected to a reducing step by treatment in a hydrogen atmosphere, to thereby reduce the metal to its elemental form in a fine uniform dispersion.

As an additional step in the preparation of crystalline alumino-silicate zeolite catalysts, the zeolite, either in its original form, after base exchange, or after impregnation with a hydrogenation component, is usually subjected to a calcination step at elevated temperatures, e.g. 400 to 1000° F., for several hours. This calcination step results in the expulsion of water of hydration to thereby form the highly porous crystalline structure responsible for the unique properties of these zeolitic materials. This calcination procedure is therefore for the purpose of activating the zeolite before its use as a catalyst, rather than regeneration after such use, which is the subject of the present invention.

As hereinbefore mentioned, the process of the invention is particularly directed to the regeneration of zeolitic catalysts which have undergone contact with sulfur; and in particular catalysts which have been used for the conversion of sulfur-containing hydrocarbon feedstocks and have become deactivated through prolonged use. The process of the invention is most advantageously practiced when the sulfur content of the zeolitic catalyst is at least about 1 wt. percent, typically about 2 to 10 wt. percent, e.g. 4 to 7 wt. percent. It will be recognized, however, that the process of the invention can be practiced with higher or lower sulfur levels, although more extensive treatments and/or less pronounced benefits may accrue.

As mentioned, the zeolitic catalyst is preferably utilized in a hydrocarbon conversion reaction and after having become substantially deactivated to the point where regeneration is required, it is treated with the aforementioned halogen-containing compounds. The treatment with the halogen-containing compound is preferably carried out in the vapor phase at elevated temperature. The treating gas may consist solely of the halogen-containing compound, or the latter can be mixed with a carrier gas, as for example, carbon-monoxide, nitrogen, and, preferably, hydrogen. The use of a carrier gas will usually not be preferred when elemental halogen is employed as the sulfur removal agent. Addition of the halogen-containing compound to the hydrocarbon feedstock being processed is also contemplated herein. For example, after a sulfur-containing feed has been processed with the zeolite catalyst, so that the catalyst contains chemically combined sulfur, the halogen compound can be added to the feed and flow of the latter continued until the sulfur content of the catalyst has been reduced. It will usually not be suitable to conduct either the halogen or halide treatment in the presence of a substantial quantity of oxygen, since the purpose of the present invention is to substantially remove the sulfur compounds before the catalyst is subjected to an oxygen treatment. Moreover, while treatment in the vapor phase is preferable, liquid phase treatment is also contemplated herein.

The concentration of the halogen and/or halide in the treating gas and the extent of such treatment are interrelated and will depend upon the amount of sulfur to be removed from the deactivated catalyst. Generally, the concentration and the extent of treatment will be designed to reduce the sulfur content of the catalyst to less than about 2 wt. percent, preferably to less than about 1 wt. percent based on the catalyst, and most preferably less than about 0.5 wt. percent. Typical concentration levels for the halogen-containing compound in the treating gas will be about 0.1 to 20 volume percent, preferably 1 to 15 volume percent, most preferably 3 to 12 volume percent.

The halogen treatment will generally be carried out at a temperature of about 200 to 1000° F., preferably 300 to 900° F., most preferably 600 to 900° F., and at pressures ranging from less than atmospheric to 2000 p.s.i.g. preferably atmospheric to 500 p.s.i.g. Suitable treatment periods can range from about 2 minutes to 72 hours, typically 30 minutes to 12 hours, e.g. 1 hour to 6 hours. It will be recognized, of course, that optimum treating conditions will depend upon the particular zeolite component in the catalyst, as well as the amount of sulfur present.

Following the halogen treatment, the catalyst is subjected to contact with an oxygen-containing gas at elevated temperatures which serves to combust contaminating deposits, e.g. "coke" deposits, hydrocarbonaceous polymerization products, etc. Conditions for this combustion step will include a temperature of 750° to 1200° F., preferably 850° to 1100° F.; a pressure of less than atmospheric to 300 p.s.i.g., preferably atmospheric to 100 p.s.i.g.; and a gas rate of 50 to 500, preferably 100 to 250 v./v./hr. The concentration of oxygen in the regenerating gas stream can range from about 0.5 to 21 vol. percent, with the remainder being made up by an inert gas such as nitrogen. The regeneration conditions, gas rate and oxygen concentration of the regeneration gas will be largely governed by the amount of carbonaceous deposit on the catalyst and the corresponding temperature that the zeolitic catalyst reaches. At all times, temperatures above about 1300° F. should be avoided in order to prevent degradation or decomposition of the zeolite crystal structure. Additionally, the presence of substantial amounts of water in the regenerating gas stream is to be avoided because of its deleterious effect on the crystal structure of the zeolite, particularly at high temperatures. Generally, the water content of the regenerating gas stream should be maintained below about 6 vol. percent, preferably 3 vol. percent. As mentioned, the teachings of the present invention are best practiced when the zeolitic catalyst contains combined sulfur, either by separate self-activation treatment, or by contact with sulfur-containing feeds, or by contact with sulfur compounds, e.g. hydrogen sulfide, during processing.

The feedstocks which can be employed with the previously described catalysts prior to the regeneration procedure taught by the present invention include a wide variety of hydrocarbon feeds of various origins; for example, petroleum crude, various fractions therefrom such as catalytic, recycle stocks, gas oil, topped crude, naphthas of all types, reformates, etc., as well as shale oil, synthetic oils, etc.

Operating details for hydrocarbon conversion processes with the aforemtioned catalysts are now well known in the art. Fixed, moving or fluidized bed or slurry phase operation can be employed. The feedstock is contacted with the catalyst at suitable temperatures, feed rates, pressures, etc., to thereby effect a substantial conversion to lower boiling materials such as gasoline, middle distillate, etc. For catalytic cracking, operating conditions include a temperature of about 500° to 1200° F., preferably 750° to 1000° F.; a pressure of about 0 to 500 p.s.i.g., preferably 0 to 200 p.s.i.g.; and a space velocity of 0.2 to 20, preferably 1 to 10, v./v./hr. Hydrocracking operating conditions include a temperature of about 500 to 1000° F., preferably 700 to 950° F.; a pressure of about 500 to 3000 p.s.i.g., preferably 800 to 2000 p.s.i.g.; a space velocity of 0.2 to 20, preferably 1 to 10, v./v./hr.; and a hydrogen rate of about 500 to 20,000, preferably 1000 to 10,000, s.c.f./bbl. of feed. The hydrocarbon conversion reaction is continued until the catalyst has become substantially deactivated, as evidenced by a lowering of conversion or undesirable product selectivity. At this point the feed is discontinued and the catalyst is subjected to a regeneration procedure including the steps hereinbefore described. After catalytic activity has been substantially restored by means of the present invention, the hydrocarbon conversion reaction is resumed. The catalyst can be regenerated in situ in the case of a fixed catalytic bed; or in the case of fluidized or moving beds the catalyst can be withdrawn continuously or periodically from the reaction zone, regenerated according to the process of the invention, and then returned to the reaction zone.

The invention will be further understood by reference to the following examples, which are given for illustrative purposes.

Example 1

A crystalline alumino-silicate zeolite having uniform pore openings of about 5 A. and a silica-to-alumina mole ratio of about 2, was base exchanged with a zinc cation solution, combined with palladium, and dried. The resulting material analyzed 1.13 wt. percent sodium, 20.8 wt. percent zinc, and 0.58 wt. percent palladium. It was utilized in the hydrocracking of a light virgin gas oil feed having the following inspections: specific gravity, 34.7° API; boiling range, 450–650° F.; sulfur content, 0.18 wt. percent; nitrogen content, 20 p.p.m. Hydrocracking conditions included a temperature of 850° F., a pressure of 1000 p.s.i.g., a space velocity of 0.5 v./v./hr., and a hydrogen rate of 2000 s.c.f./per barrel. A fixed bed pilot unit was employed with a 200 hour cycle time. After the reaction was terminated by discontinuance of the feed, a sample of the catalyst was withdrawn and found to have about 6 wt. percent chemically combined surfur by X-ray diffraction analysis. The remaining catalyst was then contacted at the aforementioned conditions with the same feed containing 0.5 wt. percent tertiary butyl chloride for 16.5 hours. At this point, a sample of the catalyst was withdrawn and found to be free of chemically combined sulfur by the X-ray analysis.

Example 2

A fresh portion of the same catalyst used in Example 1 was treated with a hydrogen stream containing 10% hydrogen sulfide, so as to incorporate about 6 wt. percent sulfur into the zeolite catalyst, and to thereby simulate the sulfur-containing composition of Example 1. Hydrogen sulfide treatment of zeolitic catalysts is a known activation technique. This catalyst, having a sulfur composition similar to the used catalyst of Example 1, was divided into two separate samples. One sample was treated according to a conventional regeneration procedure by contact with air at 1050° F. and atmospheric pressure. The other sample was treated by the process of the invention; namely, by contact with a hydrogen stream containing 5 vol. percent carbon tetrachloride at 850° F., atmospheric pressure, and 330 v.v./hr., for a period of 3 hours; followed by contact with air at the same conditions used for the first sample. The air regeneration treatment for both samples was continued for 16 hours. The sulfur content and pore volume of the two samples were measured before and after the respective regeneration treatments, with the following results:

REGENERATION OF SULFUR-CONTAINING ZEOLITIC CATALYST

| Regeneration Treatment | Sulfur Wt. percent | Pore Volume, cc./g. |
|---|---|---|
| None | 6.30 | 0.31 |
| Air burning at 1,050° F | [1] 4.20 | 0.19 |
| 5 vol. percent CCl₄ in H₂ at 850° F., followed by air burning at 1,050° F | 0.21 | 0.32 |

[1] Sample analyzed 14.4 wt. percent SO₄.

As indicated by the above data, the sulfur-containing zeolitic catalyst, which was not subjected to regeneration treatment, had a sulfur content of 6.3 wt. percent and a pore volume of 0.31 cc./g. The reduction in sulfur content of the sample of the sulfur-containing catalyst which was regenerated by conventional air burning is shown to be slight, with a concurrent drastic decrease in pore volume, thereby rendering it less suitable for subsequent catalytic use. An analysis of this sample after regeneration indicated a sulfate anion content of 14.4 wt. percent. The sample regenerated by the process of the invention, wherein sulfur is first removed, e.g. by halide treatment prior to conventional air burning, exhibited an extremely low sulfur content after regeneration with no decrease in pore volume. It is evident, therefore, that conventional oxygen burning regeneration treatment of sulfur-contaminated zeolitic catalysts is ineffective in substantially reducing sulfur content, probably due to the formation of sulfate anion which remains in the catalyst. The present invention therefore provides a highly effective and useful tool for removal of chemically combined sulfur from crystalline zeolite catalysts prior to conventional oxygen burning, as well as a valuable means for enabling such conventional regeneration to be successfully used on sulfur-containing crystalline zeolite catalysts.

Example 3

A synthetic faujasite catalyst having uniform port openings of about 13 A. and a silica-to-alumina mole ratio of about 5 is utilized in the hydrocracking of a light catalytic cycle oil feed having the following inspections: specific gravity, 0.8789 at 60° F.; boiling range, 450–650° F., nitrogen content, 40 p.p.m.; sulfur content, 0.2989 wt. percent. The zeolite is base exchanged with zinc chloride solution and subsequently treated with palladium. It has an analysis of 2.02 wt. percent sodium, 11.66 wt. percent zinc, and 0.51 wt. percent palladium, and has a pore volume of about 0.32 cc./g. After the conversion reaction, the zeolite catalyst contains about 2.96 wt. percent sulfur. It is then regenerated according to the present invention by a two-stage treatment involving first contacting the catalyst with a hydrogen stream containing 12 vol. percent hydrogen chloride at a temperature of 850° F., atmospheric pressure, a space velocity of 300 v./v./hr., for a period of 200 minutes; followed by burning in air at 1050° F., atmospheric pressure, and 300 v./v./hr. Subsequent to this regeneration treatment, the catalyst is again utilized for the conversion of the aforementioned feedstock at the aforementioned conditions with a resulting higher conversion of the feed than obtained prior to the regeneration.

Example 4

This example illustrates that controlled conventional regeneration of zeolite catalysts containing chemically combined sulfur, without prior sulfur removal in accordance with the invention, results in substantially reduced catalytic activity. A catalyst prepared as described in Example I, analyzed 0.75 wt. percent sodium, 21.5 wt. percent zinc and 0.47 wt. percent palladium. It was utilized in the hydrocracking of a heavy coker naphtha feed having the following inspections: A.P.I. gravity, 47.9°; boiling range, 260–450° F.; sulfur content, 0.18 wt. percent; nitrogen content, 200 p.p.m. Hydrocracking conditions included 850° F., 1000 p.s.i.g., 0.5 v./v./hr., and 2000 s.c.f./per barrel. A fixed bed pilot plant unit was employed with a 57-day cycle time. After the reaction was terminated by discontinuance of the feed, the catalyst was regenerated at atmospheric pressure, the regeneration including the steps of hydrogen stripping at 850° F.; oxygen treatment with a nitrogen stream containing 1.5 vol. percent oxygen at an initial temperature of 650° F., followed by gradual temperature increase to 950° F., and air treatment at an initial temperature of 650° F., followed by gradual temperature increase to 1000° F. This procedure is an accepted technique for regenerating deactivated zeolitic catalysts. Upon resumption of the hydrocracking reaction with the regenerated catalyst of this example, its hydrocracking activity measured less than 50% of that of freshly charged catalyst, whereas an activity of over 85% would normally be expected. Subsequent analysis indicated that although the catalyst retained a good degree of crystallinity, it had a sulfur content of 5.88 wt. percent. It is again evident, therefore, that the presence of sulfur in zeolitic catalysts prior to conventional oxygen or air regeneration procedures, is detrimental to subsequent catalyst activity.

What is claimed is:

1. A process for regenerating a catalyst comprising a crystalline alumino-silicate zeolite which has been deactivated by coke deposits and by contact with a sulfur compound consisting essentially of the steps of
    (a) Contacting said catalyst at a temperature in the range of 200–1000° F. with a halogen-containing material selected from the group consisting of free halogens, hydrogen halides, alkyl halides and carbon tetrachloride whereby a major proportion of the sulfur compound is removed,
    (b) Subsequently contacting the partially regenerated catalyst from step (a) with an oxygen containing gas at a temperature in the range of 750–1200° F. whereby coke deposits are burned from the catalyst and
    (c) Recovering a regenerated catalyst.

2. Process according to claim 1 in which said material is chlorine.

3. Process according to claim 1 in which said material is hydrogen chloride.

4. Process according to claim 1 in which said material is tertiary butyl chloride.

5. Process according to claim 1 in which said material is methyl chloride.

6. The process of claim 1, wherein said catalyst contains a platinum group metal.

7. The process of claim 1, wherein said zeolite has uniform pore openings of about 5 to 15 A. and contains less than about 10 wt. percent alkali metal oxide.

8. The process of claim 1, wherein said catalyst has become deactivated in the catalytic processing of a sulfur-containing hydrocarbon feed stock.

9. The process of claim 1, wherein said zeolite has been base exchanged with a cation selected from the group consisting of hydrogen-containing cations and metal cations.

10. The process of claim 1, wherein the sulfur content of said catalyst prior to said reduction of sulfur content is at least about 1 wt. percent.

11. The process of claim 1, wherein said sulfur content is reduced to below about 1 wt. percent based on the weight of said catalyst.

12. The process of claim 1, wherein said material is carbon tetrachloride.

References Cited

UNITED STATES PATENTS

| 3,172,863 | 3/1965 | Brooke | 252—415 |
| 3,182,013 | 5/1965 | Myers | 252—415 XR |
| 3,197,397 | 7/1965 | Wight et al. | 208—111 |
| 3,318,802 | 5/1967 | Martin | 252—455 XR |

PATRICK P. GARVIN, *Primary Examiner.*

U.S. Cl. X.R.

208—111, 120; 252—416, 455